United States Patent
Feng et al.

(10) Patent No.: US 6,467,368 B1
(45) Date of Patent: Oct. 22, 2002

(54) HAND OPERATED BICYCLE GEAR TRANSMISSION DEVICE

(75) Inventors: Chan-Hua Feng, Chia-Yi Hsien (TW); Chun-Yu Li, Tai-chung (TW)

(73) Assignee: National Science Council of Republic of China, Taipei (TW)

( * ) Notice: Subject to any disclaimer, the term of this patent is extended or adjusted under 35 U.S.C. 154(b) by 0 days.

(21) Appl. No.: 09/365,758

(22) Filed: Aug. 3, 1999

(51) Int. Cl.[7] ............................................. F16C 1/18
(52) U.S. Cl. ........................... 74/501.6; 74/489; 74/506
(58) Field of Search ............................ 74/502.2, 501.6, 74/489, 506, 527, 473.14, 473.13

(56) References Cited

U.S. PATENT DOCUMENTS

| | | | | |
|---|---|---|---|---|
| 4,222,286 A | * | 9/1980 | Huret | 74/502.2 |
| 4,848,502 A | * | 7/1989 | Kikuta et al. | 74/502.2 |
| 5,052,242 A | * | 10/1991 | Look et al. | 74/502.2 |
| 5,577,413 A | * | 11/1996 | Tagawa et al. | 74/489 |
| 5,588,331 A | * | 12/1996 | Huang et al. | 74/502.2 |
| 5,588,925 A | * | 12/1996 | Arbeiter et al. | 74/502.2 |
| 5,676,020 A | * | 10/1997 | Jordan et al. | 74/473.14 |
| 5,682,963 A | * | 11/1997 | Tang | 74/502.2 |
| 5,732,598 A | * | 3/1998 | Shoge et al. | 74/502.2 |
| 5,802,927 A | * | 9/1998 | Yu et al. | 74/502.2 |
| 5,845,537 A | * | 12/1998 | Campagnolo | 74/489 |
| 5,921,139 A | * | 7/1999 | Yamane | 74/489 |
| 6,021,688 A | * | 2/2000 | Chang | 74/502.2 |
| 6,067,875 A | * | 5/2000 | Ritchey et al. | 74/502.2 |

* cited by examiner

*Primary Examiner*—Chong H. Kim
(74) *Attorney, Agent, or Firm*—Bacon & Thomas, PLLC

(57) ABSTRACT

A hand operated bicycle gear transmission device. The device includes a handle bar fixing base, a cover fixing base, a rubber cover, a positioning plate, positioning protuberances, saucer shaped springs, a circular fixing hole for a steel cable head, a steel cable guide groove and a stroke compensating device. The device utilizes cooperative function of positioning recessed slots formed around a rigid positioning plate. The positioning protuberances are provided at the rear of the cover fixing base and the saucer shaped springs are adjacent to the positioning plate to provide mutual engagement force therebetween so as to achieve an excellent positioning effect of gear transmission even under the worst riding environment. As a result, the device can be conveniently operable with a small applied force to perform speed change smoothly, the device having a simplified and easy looking appearance constructed with a small number of components, and being able to easily be assembled and repaired.

4 Claims, 7 Drawing Sheets

HAND OPERATED BICYCLE GEAR TRANSMISSION DEVICE

BACKGROUND OF THE INVENTION

1. Field of the Invention

The present invention relates to hand operated bicycle gear transmission device, and more particularly, to a multi-stage gear transmission device for bicycle comprising manual operation part, handle bar fixing function part, steel transmission cable guide part and gear position fixing part with which to carry out effective and reliable power transmission and speed change for a bicycle.

2. Description of the Prior Art

Generally, a well known conventional bicycle with multi-stage gear transmission device transmits power by appropriate combination of gear set in the gear transmission device according to different road condition.

Especially for long distance excursion in a bad road course, it is important for a bicycle to have a reliable and stable gear transmission in addition to an exact gear shift effect for speed change. The gear transmission system for speed change in a bicycle usually comprises a large chain wheel, a chain, both for power transmission, a rear sprocket wheel, a gear transmission device, a gear shift lever. According to operation manner of the gear shift lever, the gear shift lever can be classified a single gear shift lever, a dual returnable gear shift lever and a hand operated gear shift lever which is resembling the present invention. Among the above three types, the single gear shift lever is simplest in construction and easiest for manufacture and assembly. However, it has the disadvantages of too large operation range and uncomfortableness caused by stiff contact feeling of the lever end to the rider's palm. In addition, the positioning of this type is carried out by frictional force, which in certain cases, for example, riding on a severely vibrating rugged road, may cause lost of engaging force of the shift lever. As a result, the chain fails to be settled at its exact gear position.

As for the dual returnable gear shift lever, although it can considerably attain a precise positioning effect even in a bad riding environment, yet the operation and positioning effect have to be performed with the cooperation of two sets of mechanism. As a result, the constitution of the gear shift lever mechanism becomes complicated which leads to increase of production and assembly costs. Therefore, it is mostly adopted by high class bicycles.

In order to eliminate the shortcomings inherent to the conventional technique as mentioned above, the inventor of the present invention has made hard study and trials in this field persistently for a long time, and finally has succeeded in disclosing the present invention.

SUMMARY OF THE INVENTION

It is an object of the present invention to provide hand operated bicycle gear transmission device having steel transmission cable guide part and gear position fixing part independently carrying out their respective functions for the convenience of assembly and maintenance.

It is another object of the present invention to provide hand operated bicycle gear transmission device which can be simply operated to perform speed change of a bicycle.

It is still another object of the present invention to provide hand operated bicycle gear transmission device of a simple construction so as to facilitate assembly and repair work.

To achieve these and other objects, gist of the present invention is directed to provide hand operated bicycle gear transmission device comprising a handle bar fixing base, a cover fixing base, a rubber cover, a positioning plate, positioning protuberances, saucer shaped aprings, a circular fixing hole for the steel cable head, a steel cable guide groove and a stroke compensating means. Incidentally, hand operated bicycle gear transmission device of the present invention utilizes cooperative function of a plurality of positioning recessed slots formed around the rigid positioning plate, the positioning protuberances provided at the rear of the cover fixing base and the saucer shaped springs adjacent to the positioning plate to provide mutual engagement force therebetween so as to achieve an excellent positioning effect of gear transmission even under the worst riding environment. As a result, the hand operated bicycle gear transmission device of the present invention has lots of merits such as being conveniently operatable with a small applied force to perform speed change smoothly, having simplified and easy looking construction with small amount of components, and being able to be easily assembled and repaired.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

Figure 1:
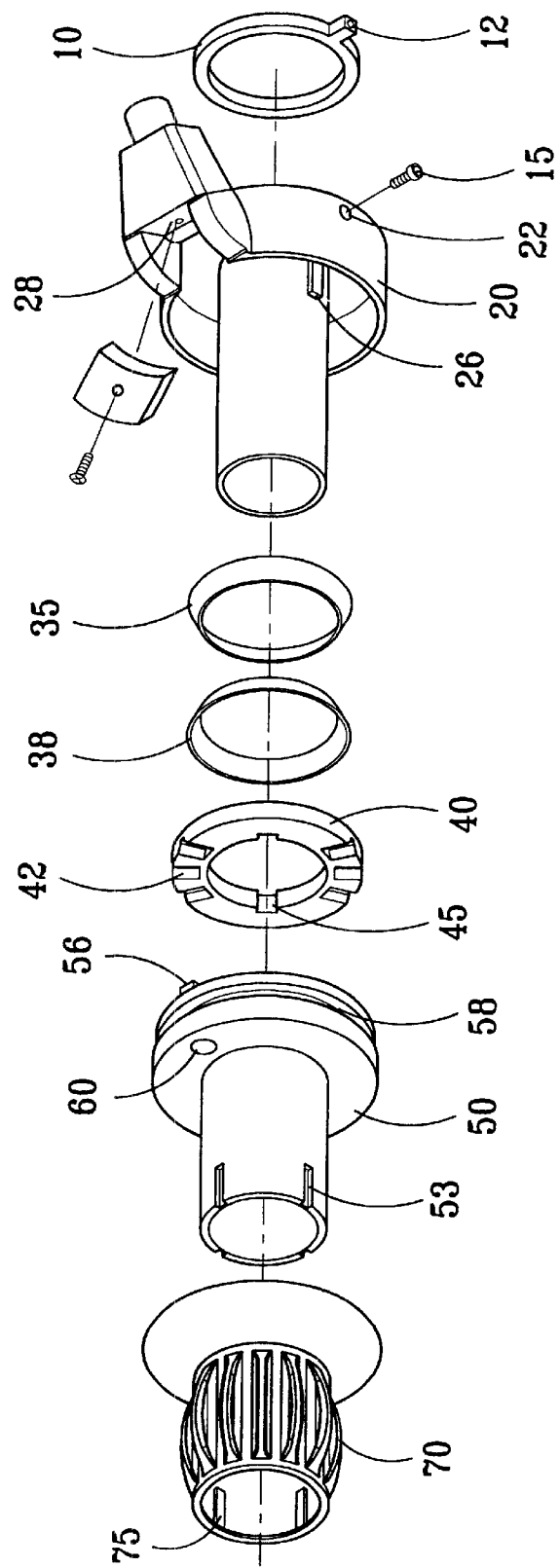
FIG. 1 is an illustrative exploded view of a whole system of hand operated bicycle gear transmission device according to the present invention.

Referring to FIG. 1, the hand operated bicycle gear transmission device of the present invention comprises a handle bar fixing base 20 fixed on the handle bar of the bicycle; a cover fixing base 50 for mounting a rubber cover 70 for the rider to grip and turn around to transmit the applied torque; the cover fixing base 50 is installed co-axially with the handle bar of the bicycle on the handle bar fixing base 20 so as to be able to rotate with respect to each other; a positioning plate 40 for positioning the gear transmitted at a position corresponding to a desired speed; a positioning protuberance 56 for engaging with one of recessed slots 42 formed on the positioning plate 40 for obtaining a desired speed; saucer shaped springs 35, 38 are pre-stressed to deform during assembly to reserve a restoring force applying to the adjacent positioning plate 40 so as to guarantee a dependable engaging force between the positioning protuberance 56 and the speed change recessed slot 42 so that preventing unexpected trip off of the protuberance 56 from the recessed slot 42; a circular hole 60 for fixing a steel cable head is provided to confine the steel cable head therein and cause the steel cable to move when pulled; a steel cable guide groove 58 for guiding the steel cable therein thereby controlling the moving route of the steel cable during the operation of the gear shift lever; and a stroke compensating means sfor providing compensation of excessive shift of the lever during speed change operation for each gear position.

Figure 2:
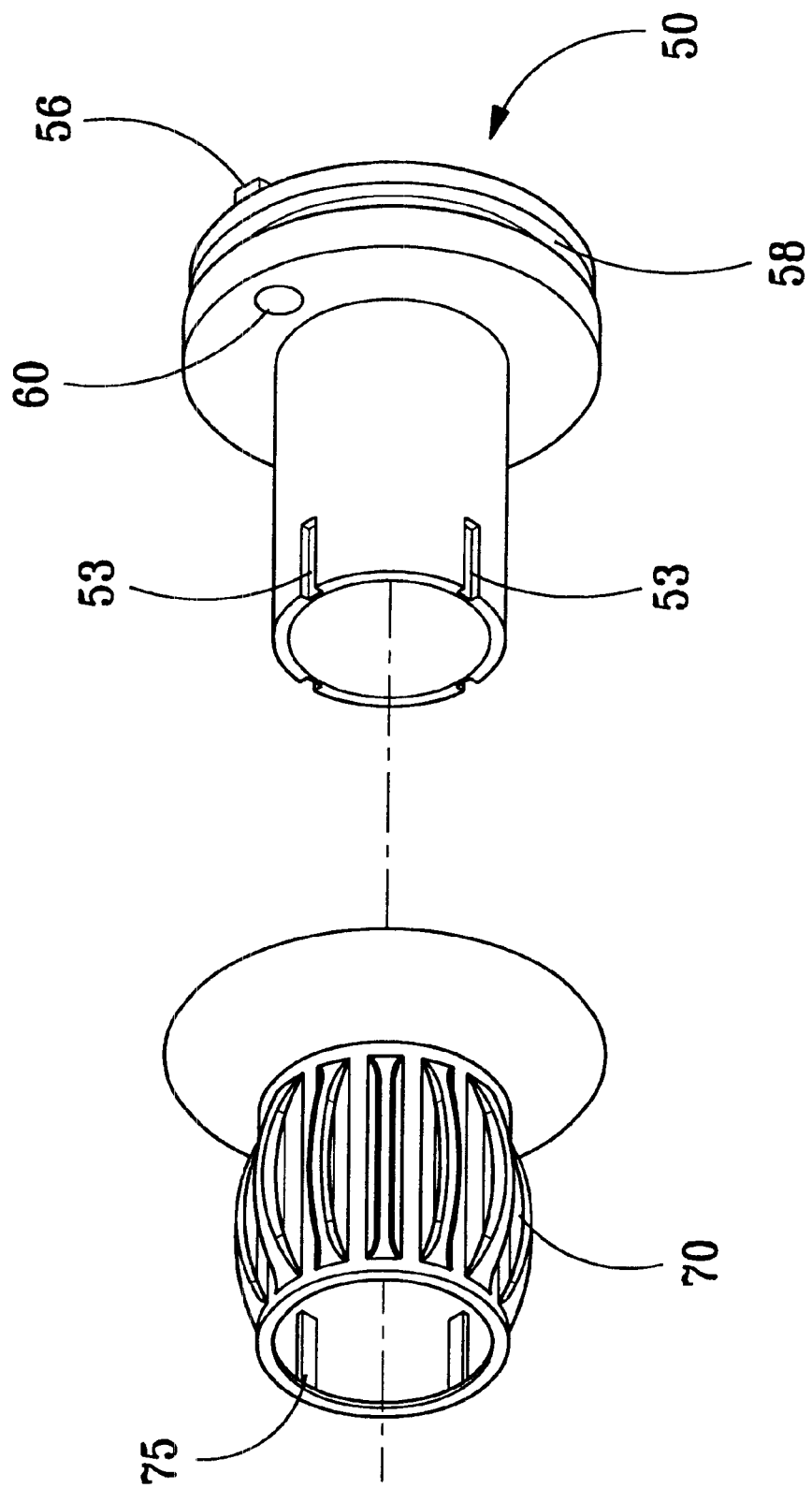
FIG. 2 is an illustrative view showing operational principle and construction of the rubber cover and the cover fixing base in the manual operation part according to the present invention.

Referring to FIG. 2, the manual operation part of the present invention is composed of the rubber cover 70 and the cover fixing base 50, several fixing protuberances 75 are formed around the inner periphery of the rubber cover 70, whereas several fixing recessed slots 53 are formed around the shaft surface of the cover fixing base 50. In the assembly process, as the rubber cover 70 is adapted over the cover fixing base 50 from its axial direction, the fixing protuberances 75 couple and engage with the corresponding fixing recessed slots 53 firmly so as to prevent slipping between the rubber cover 70 and the cover fixing base 50 and invalidate gear shift operation when the bicycle is moving. Furthermore, the number and the shape of the protuberances 75 and corresponding recessed slots 53 must be carefully determined so as to prevent deformation or even loosening of the soft rubber cover 70 from its position by too large grasping force and torque exerted thereon by the rider's plam, or in the worst case, crack of rubber material caused by excessive concentration of stress due to insufficient number of fixing protuberances 75 and recessed slots 53 for uniformly distributing the torque produced by lever shift operation.

Figure 3:
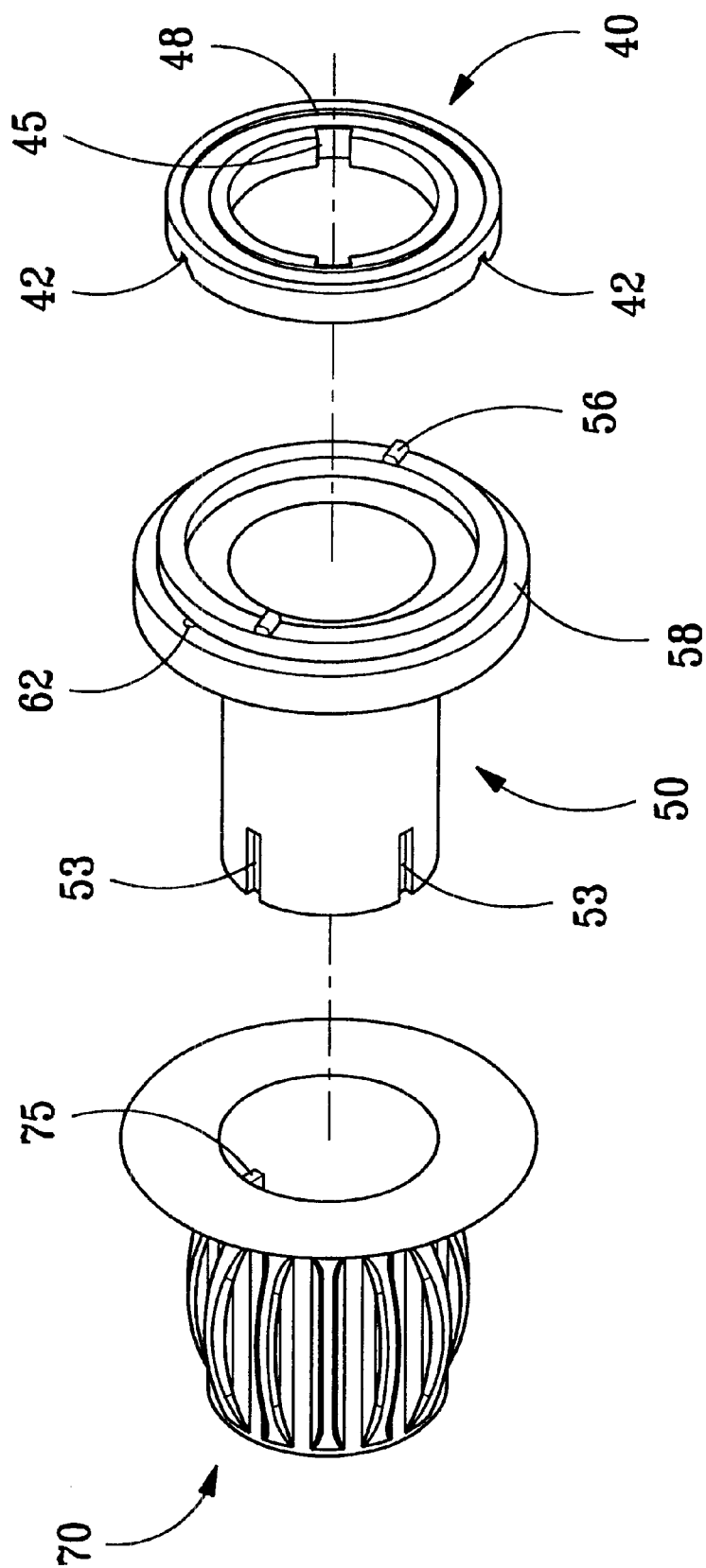
FIG. 3 is a three dimensional view of the positioning plate and the protuberances provided at the rear of the cover fixing base both belong to the gear position fixing part according to the present invention.

As shown in FIG. 3, the gear position fixing function of the present invention is performed by mutual engagement of the recessed slot 42 formed on the positioning plate 40 and the positioning protuberance 56 provided at the rear part of the cover fixing base 50. It should be noted that there is difference in slope between two side surfaces of the recessed slot 42. The slow slope is for a low-speed gear transmission lever shift operation because in this case it must overcome in addition to the frictional force between the protuberance and the recessed slot, a force produced in the steel cable owing to deformation of the springs, while in a high speed gear transmission lever shift operation, the use of steep slope surface of the recessed slot 42 is enough because there is no additional force due to deformation of the springs will be exerted to the steel cable. A recessed groove 48 provided around inner part of the positioning plate 40 is for settling the saucer shaped springs 35, 38 for the purpose of limiting their deformation thereby preventing fatigue of elasticity.

The function of compensation for excessive displacement during positioning is performed by the engagement between two recessed slots 45 formed on inner surface of the positioning plate 40 and two protuberances 26 formed on the inner surface of the handle bar fixing base 20 (see also FIG. 1). The compensative allowance is provided by means of the difference of center angle between the two sets of coupled elements 45 and 26. The shoulder of the positioning protuberances 56 formed on the cover fixing base 50 is buffed round thereby preventing hurting the surface of recessed slots 42 on the positioning plate 40, and also reducing the resistant force during gear shift operation.

The adequate number of recessed slots 42 corresponding to the required speed change is provided on the circular shaped positioning plate 40. The angle between adjacent recessed slots 42 and the angle occupied by individual recessed slot 42 must be accurately calculated to permit the best condition or performing the gear transmission operation for speed change.

Figure 4:
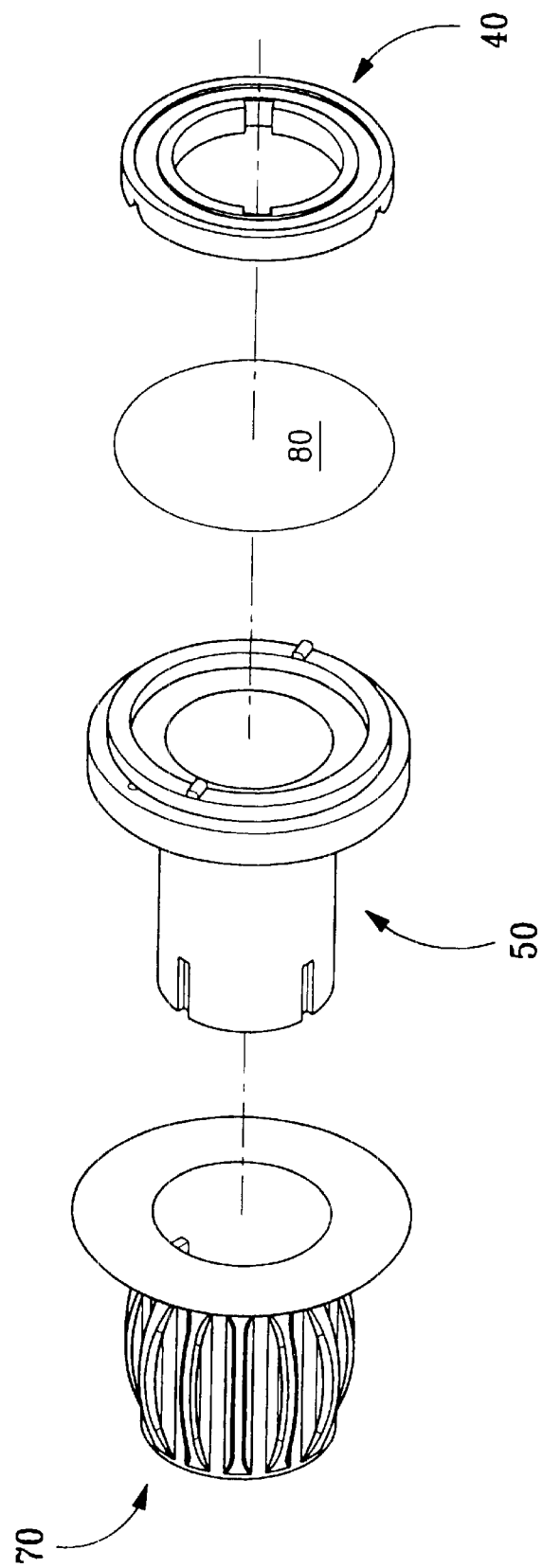
FIG. 4 is a three dimensional view of the positioning plate and the protuberances provided at the rear part of the cover fixing base all belong to gear position fixing part according to another embodiment of the present invention.
Figure 5:
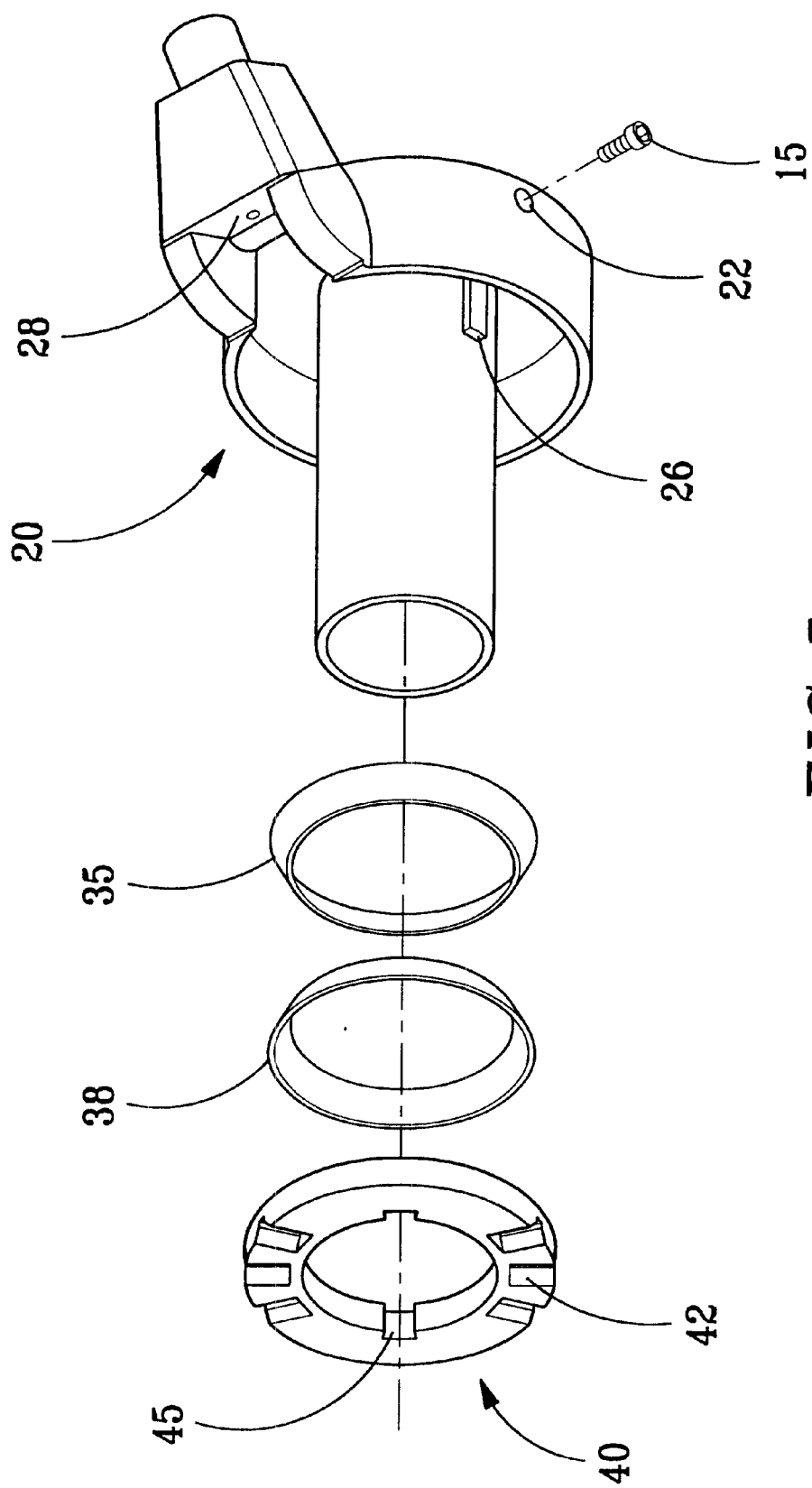
FIG. 5 is a three dimensional exploded view of the positioning plate, saucer shaped springs and the handle bar fixing function part according to the present invention.

FIG. 4 is a three dimensional view of the positioning plate 40 and the protuberances 56 provided at the rear part of the cover fixing base 50 both belong to gear position fixing part according to another embodiment of the present invention. As shown in FIG. 4, a piece of positioning spring 80 (shown arbitrarily as an abstract circular block, wherein the actual shape is not shown) is interposed between the positioning plate 40 and the cover fixing base 50. The properties and shape of the spring 80 are described as follows. Two recessed slots that are positioned apart 180° from each other are formed on the front (lower) circumference of the spring 80. These two recessed slots are used to engage with two positioning protuberances 56 formed on the cover fixing base 50. There are two protuberances formed on the rear (upper) circumference of the spring 80 for coupling with a plurality of recessed slots 42 radially formed on the positioning plate 40 corresponding to respective gear position for different speed (see FIG. 5). The saucer shaped springs 35, 38 (see FIG. 5) are employed to oppress tightly those coupled recessed slots and protuberances located on the positioning plate 40, spring 80 and the cover fixing base 50 so as to ensure reliable gear lever shift for speed change and prevent unexpected tipping off from the operating gear position.

The top portion of the protuberance 85 formed on the upper circumference of the spring 80 is slightly modified to have high crowned shape so as to prevent hurting the recessed slots 42 provided on the surface of the positioning plate 40. The protuberance and the spring 80 can be formed of injection molding into an integrate piece or inlaying a piece of spring having equivalent function in the position of the protuberance on the spring 80.

When the cover fixing base 50 turns and makes an angular displacement with respect to the handle bar fixing base 20, the positioning spring 80 will cause the recessed slot to tightly combine with the positioning protuberance 56 formed at the rear part of the cover fixing base 50 with the aid of the compressive force exerted by the saucer shaped springs 35, 38, and therefore make the same angular displacement following the cover fixing base 50, finally, the protuberance on the spring 80 slides into the desired recessed slot 42 of the positioning plate 40.

Referring to FIG. 5 again, by applying the reactional force from the compressed springs 35, 38 on the positioning plate 40 to combine the protuberance 56 of the cover fixing base 50 tightly with the recessed slot 42 on the positioning plate 40 thereby preventing unexpected tripping off from operating gear position. On the other hand, the rider may hear a sound and feel a reactional force on his palm during operation of gear shift lever so that the rider may assure the protuberance 56 has been shifted to another recessed slot 42. In order to protect the saucer shaped springs 35, 38 from unrecoverable deformation caused by excessive pressure, an annular groove 48 is formed around the rear (upper) circumference of the positioning plate 40 to accommodate the rim of the spring 38 thereby confining it thereof and controlling the degree of its deformation. The dimension of the springs 35, 38 has a certain limit, that is, its inner diameter of the smaller opening shall be larger than the outer diameter of the protuberance 26 so as to make it possible to dispose the combination of springs 35, 38 in the inner space of the handle bar fixing base 20. Besides, the total thickness of the positioning plate 40 plus the springs 35, 38 shall be smaller than the annular wall thickness of the handle bar fixing base 20 so that an excessive pressure upon the saucer shaped springs 35, 38 during assembly can be prevented.

Figure 6:
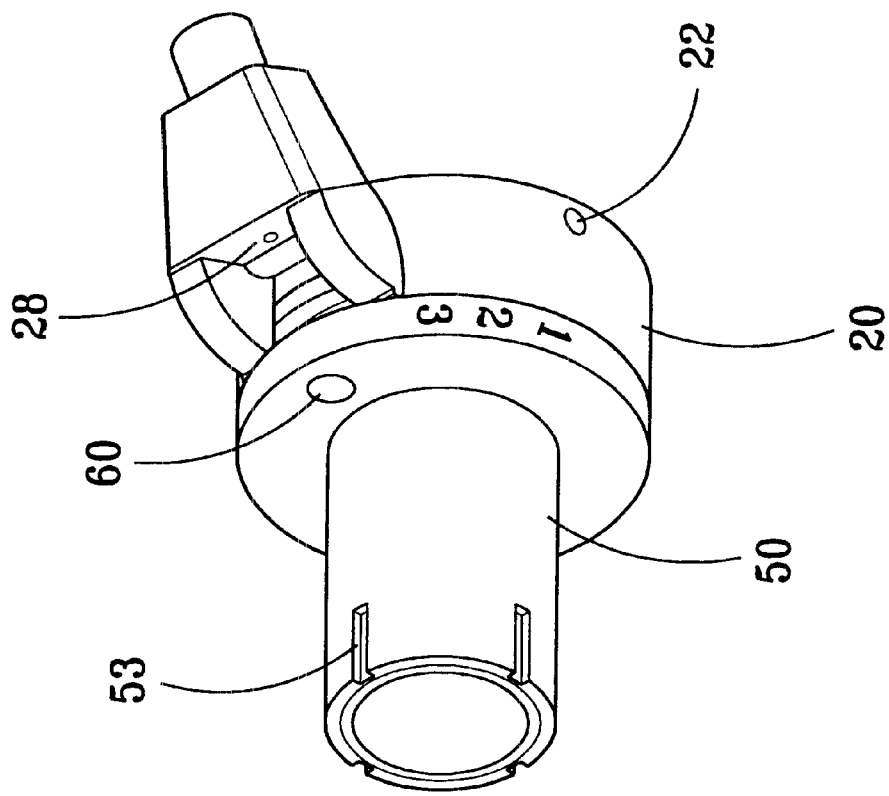
FIG. 6 is an assembly drawing of the steel transmission cable guide part according to the present invention.

FIG. 6 is an assembly drawing of the steel transmission cable guide part according to the present invention. It is observed that there is a circular hole 60 (also see FIG. 1) provided on the lower surface of the cover fixing base 50 for confining the steel cable head, whereas the steel cable comes out through a rear through hole 62 (See FIG. 3), and then enters in a pre-designed steel cable guide groove 58 as shown in FIG. 1. After surrounding around the groove 58, the steel cable is guided to a flare opening 28 provided at the front end of the handle bar fixing base 20 along a steel cable pathway and after fine adjustment, is connected to the gear transmission device through a four-bar linkage and chain thereof for transmitting the lever shift operation of speed change.

In the present invention, the layout and installation of the steel cable is characterized by that the connection of front half portion of the steel cable is carried out in the annular spacing between the groove 58 and positioning protuberance 56 so that the functions of speed change positioning operation and steel cable transmission are performed individually independent of each other. The speed change positioning is carried out in a closed space whose way of design is quite different from the conventional figure in which the steel cable head is fixed on a positioning element for transmitting gear shift operation.

When installing the steel cable, the cover fixing base 50 is turned to a specified marking position in advance, and then directly passes the steel cable through the circular hole 60, and is pulled out from the flare opening 28 of the handle bar fixing base 20 via annular groove 58. The way of layout and installation as such is not only convenient in assembly process of production line, but also saving the cost and time for maintenance work because it is not necessary to detach the cover and gear shift lever for repair or replacing the steel cable as that has to be done in conventional design.

Figure 7:
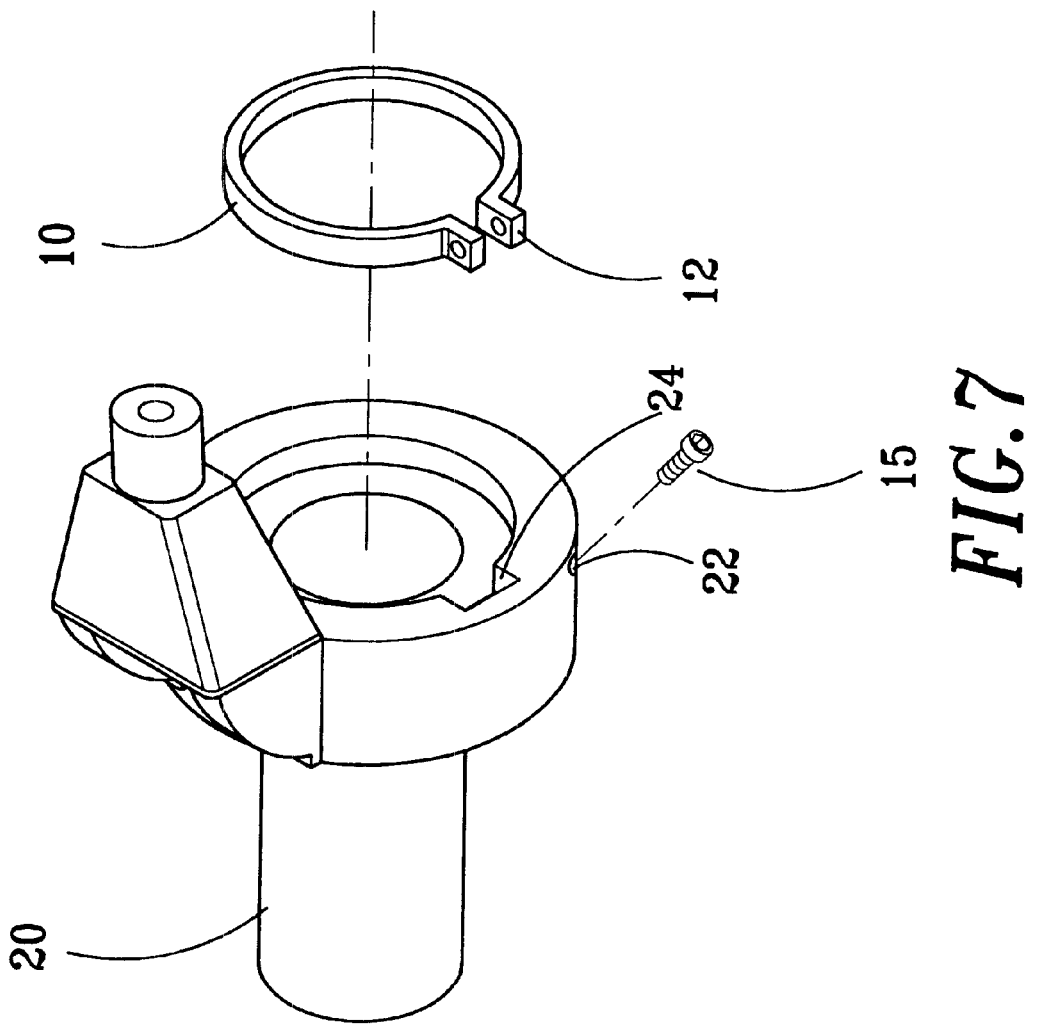
FIG. 7 is a three dimensional exploded view of the fixing collar, screw and the annular groove provided for the handle bar fixing function part according to the present invention.

FIG. 7 is a three dimensional exploded view of a fixing collar, screw and a annular groove provided for the handle bar fixing function part according to the present invention. Here, a fixing collar 10 is adapted to an annular groove 24 formed on the rear (upper) part of the handle bar fixing base 20, and then using a hexagonal screw 15 to combine with a joint 12 of the fixing collar 10 through a screw hole 22 so as to install the fixing collar 10 on the handle bar fixing base 20. When installing the gear shift lever on the. handle bar, the lever can be inserted into an appropriate position on the handle bar from its outer end and engaged tightly with a screw driver so that the surface of the handle bar is directly oppressed and recessed somewhat by the screw head. As a result, the gear change device is installed reliably on the bicycle without the fear of loosening during riding the bicycle. The engaging force of the gear change device is proportional to the advancing of the tightening screw.

Compared to the conventional design mentioned above, the hand operated bicycle gear transmission device of the present invention has lots of merits such as being conveniently operatable with a small applied force to perform speed change smoothly, having simplified and easy looking appearance constructed with small amount of components, and being able to be easily assembled and repaired. In addition, most of the components for positioning means can be made of plastic material by injection molding so that the production and assembly costs can be greatly reduced.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A hand operated bicycle gear transmission device comprising:

a handle bar fixing base for securing the gear transmission device on a handle bar of a bicycle frame, and positioning all component parts of the gear transmission device at respective positions;

a cover fixing base adapted for loading a rubber cover and being installed on said handle bar fixing base co-axially with the handle bar of the bicycle thereby the two bases are rotatable with respect to each other;

the rubber cover adapted to be rotated by a rider of a bicycle to transmit torque via the rubber cover to the cover fixing base;

a positioning plate having a plurality of recessed slots for engaging with a positioning protuberance of the cover fixing base for obtaining a desired speed and positioning effect;

the positioning protuberance adapted for engaging with one of the plurality of recessed slots formed on said positioning plate for obtaining a desired speed;

two compressible springs being pre-stressed to deform during assembly to reserve a restoring force applied to the positioning plate so as to guarantee a dependable engaging force between said positioning protuberance and one of said indexing recessed slots thereby preventing said positioning protuberance from disengaging from one of said indexing recessed slots;

the cover fixing base comprising a circular hole adapted for fixing and confining a steel cable head therein and causing a cable attached to the cable head to move when pulled by the rotation of the cover fixing base;

a steel cable guide groove for detaining the steel cable in the cable guide groove so as to control the moving route of said steel cable without derailing during speed change; and a stroke compensating means attached to the gear transmission device for providing compensation of excessive shift of a gear shift lever during speed change for each gear position.

2. The device as claimed in claim 1, wherein said circular hole is provided on the lower surface of said cover fixing base of the manual operation part for confining said steel cable head, whereas said steel can comes out by passing through a rear through hole, and then enters in said pre-designed guide groove, after surrounding around said groove, said steel cable is guided to a flare opening provided at the front end of said handle bar fixing base along a pathway and after fine adjustment, is connected to said gear transmission device.

3. The device as claimed in claim 1, wherein said compressible springs are saucer shaped.

4. The device as claimed in claim 3, wherein said saucer shaped springs provide a pre-stress on the positioning plate so as to ensure tight engagement of the positioning protuberance with the recessed slots, thereby holding the gear firmly in an exact position.

* * * * *